M. CONNER.
COMBINED EGG BEATER AND POTATO MASHER.
APPLICATION FILED OCT. 30, 1916.
1,214,010.
Patented Jan. 30, 1917.
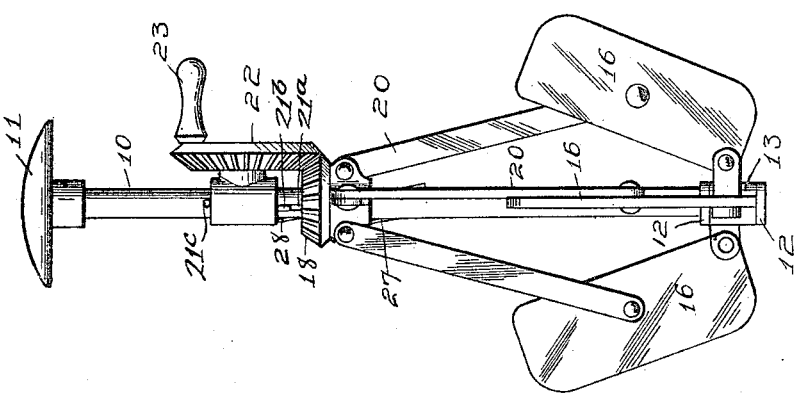
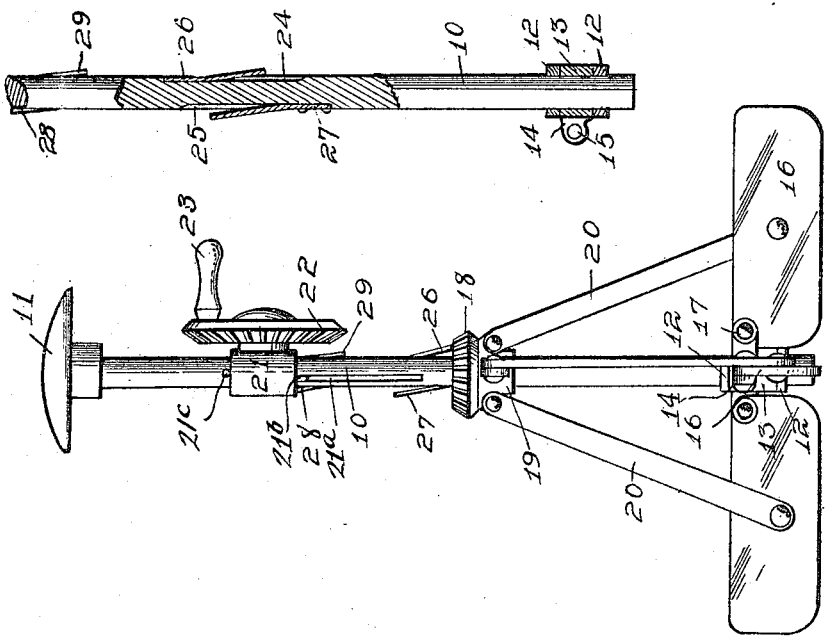
Witness
A. G. Hague
Inventor
May. Conner
by Orwig & Bair attys

UNITED STATES PATENT OFFICE.

MAY CONNER, OF GARDEN GROVE, IOWA.

COMBINED EGG-BEATER AND POTATO-MASHER.

1,214,010.  Specification of Letters Patent.  Patented Jan. 30, 1917.

Application filed October 30, 1916. Serial No. 128,459.

*To all whom it may concern:*

Be it known that I, MAY CONNER, a citizen of the United States, and resident of Garden Grove, in the county of Decatur and State of Iowa, have invented a certain new and useful Combined Egg-Beater and Potato-Masher, of which the following is a specification.

The object of my invention is to provide a combined egg beater and potato masher of simple, durable and inexpensive construction.

A further object is to provide such a device having an upright member with laterally extending blades pivoted thereto, and a gearing device slidably mounted on the upright member and connected by suitable means with said blades, said device having a rotating gearing member with a handle thereon, slidably mounted on said upright.

A further object is to provide such a device so constructed and arranged that the first gearing device may be held in different positions longitudinally of the upright member.

My invention consists in the construction, arrangement and combination of the various parts of the device, whereby the objects contemplated are attained, as hereinafter more fully set forth, pointed out in my claims and illustrated in the accompanying drawings, in which:

Figure 1 shows a side elevation of my improved combined egg beater and potato masher in one position of its adjustment. Fig. 2 shows a similar view, the parts being in another of their adjusted positions, and Fig. 3 shows a side elevation of the upright member partly in section, showing the means for holding one of the sliding gearing members in its different positions.

In the drawings herewith whereby my invention is illustrated, I have used the reference numeral 10 to indicate generally an upright member having at its upper end a head 11 adapted to fit the palm of the hand.

Mounted on the lower end of the upright member 10 and spaced from each other and from the lower end of the member 10, are two collars 12 which are fixed to the upright. Rotatably mounted on the member 10 between the collars 12, is a sleeve 13 having laterally projecting lugs or ears 14 provided with openings 15. Pivoted to the lugs 14 are stirrer blades 16 which are pivoted by means of bolts or the like 17. Slidably mounted on the upright 10 is a beveled gear 18, having a hub 19. It may be mentioned that any number of stirrer blades may be employed, but I preferably use four.

Pivoted to the hub 19 are four links 20 extending downwardly and outwardly from the hub 19. The lower ends of the links 20 are pivoted to the respective stirrer blades 16, as illustrated in Figs. 1 and 2.

Slidably but nonrotatably mounted on the upright 10 above the gear 18 is a sleeve 21, on which is rotatably mounted a beveled gear 22 having a handle 23. The beveled gear 22 is designed to mesh with the beveled gear 18, a lug 21$^b$ on the sleeve 21 slides in an elongated slot 21$^a$ in the upright 21.

The upright 10 is provided, preferably on opposite sides between its ends, with recesses 24 and 25. Received in the upper portion of the recess 24 and secured to the upright 10 is the upper end of the spring 26. The lower end of the spring 26 extends downwardly and outwardly from the upright 10, as shown in Fig. 3.

Received in the lower portion of the recess 25 and secured to the upright 10, is the lower end of a spring 27. The upper end of the spring 27 projects upwardly and away from the upright 10. The upper end of the spring 27 is above the lower end of the spring 26, as clearly shown. Spaced above the springs 27 and 26 on the upright 10 are similarly arranged springs 28 and 29, with their inner ends secured in recesses similar to the recesses 25 and 24.

In the practical use of my improved device, when the sleeve 21 is in its raised position it will be seen that it will be above the spring 28 and will be held by the spring 28 against downward movement. The sleeve 21 is held against further upward movement on the upright 10 by a pin 21$^c$. The gear 18 may then be moved to its lowered position, when the stirrer blades 16 are horizontal and the spring 26 will then hold the gear 18 against any upward movement. The device may then be used as a potato chopper or cutter or masher by raising it and quickly lowering it.

If it is desired to use the blades in their horizontal position for whipping eggs or cream or the like, the spring 28 is forced inwardly and the sleeve 21 is allowed to slide down the upright 10 until the gears 18 and 22 mesh with each other. When the sleeve 21 is moved to its lower position where the gears mesh, said sleeve will be held against upward movement by the spring 28. The handle 23 may then be manipulated for rotating the gear 22, and the blades 16 may be rotated around the upright 10.

If desired the sleeve 21 may be raised, the spring 26 may be forced inwardly and the gear 18 may be raised until the hub 19 rests above the spring 27 with the gears in mesh and with the stirrer blades 16 in their raised positions shown in Fig. 2. Thereupon the handle 23 may be manipulated for rotating the gear 18 and the blades 16 for beating eggs or whipping cream or for other purposes.

It is obvious that my device is of comparatively simple and inexpensive construction, and that its parts are adjustable for a wide variety of uses.

It is my intention to cover by the patent to be issued upon this application, any modified forms of structure in the device, or any use of mechanical equivalents in the manufacture thereof which may be reasonably included within the scope of the claims of such patent.

I claim as my invention:

1. In a device of the class described, an upright member, a plurality of stirrer blades pivotally and rotatably mounted thereon, a gearing device rotatably and slidably mounted on said upright, links pivoted to said gearing device and to the respective stirrer blades, a sleeve slidably but non-rotatably mounted on said upright, and a gear rotatably mounted on said sleeve and adapted to mesh with said first gearing device.

2. In a device of the class described, an upright member, a plurality of blades pivotally and rotatably mounted on said upright, a gearing device slidably mounted on said upright, links pivoted to said gearing device and to the respective blades, adjustable means for holding said gearing device against sliding upwardly on the upright when the gearing device is in its lowermost position, adjustable means for holding the gearing device against sliding downwardly when said gearing device is in the higher position on the upright, a sleeve on said upright, and a gearing mounted on said sleeve adapted to coact with said first gearing device, for imparting rotation around the upright to said blades.

3. In a device of the class described, an upright member, a plurality of blades pivotally and rotatably mounted on said upright, a gearing device slidably mounted on said upright, links pivoted to said gearing device and to the respective blades, adjustable means for holding said gearing device against sliding upwardly on the upright when the gearing device is in its lowermost position, adjustable means for holding the gearing device against sliding downwardly when said gearing device is in the higher position on the upright, a sleeve on said upright, a gearing mounted on said sleeve adapted to coact with said first gearing device, for imparting rotation around the upright to said blades, said sleeve being slidably but nonrotatably mounted, and adjustable means for holding said sleeve against upward movement when in one position of its sliding movement on the upright, and for holding said sleeve against downward movement when in another position on the upright.

Des Moines, Iowa, October 14, 1916.

MAY CONNER.

Copies of this patent may be obtained for five cents each, by addressing the "Commissioner of Patents, Washington, D. C."